United States Patent [19]
Kojima et al.

[11] Patent Number: 5,457,667
[45] Date of Patent: Oct. 10, 1995

[54] DATA RECORDING/REPRODUCING APPARATUS WITH ALTERNATING ACCESS OF COMPRESSED WORKS

[75] Inventors: Kunio Kojima, Nara; Shigemi Maeda, Yamatokoriyama; Jun Akiyama, Kashihara, all of Japan

[73] Assignee: Sharp Kabushiki Kaisha, Japan

[21] Appl. No.: 7,276

[22] Filed: Jan. 21, 1993

[30] Foreign Application Priority Data

Jan. 23, 1992 [JP] Japan .................... 4-009702

[51] Int. Cl.⁶ ............................ G11B 7/00
[52] U.S. Cl. .......................... 369/32; 369/47
[58] Field of Search ............... 369/32, 83, 13, 369/33, 47, 48, 54, 56, 30, 58, 59, 44.26, 275.3; 360/8, 32, 72.01; 395/146, 155, 162

[56] References Cited

U.S. PATENT DOCUMENTS 5,153,861  10/1992  Maeda et al. .................. 369/32
5,220,648   6/1993  Sato ........................... 395/146
5,343,452   8/1994  Maeda et al. .................. 369/32

FOREIGN PATENT DOCUMENTS

0473305  3/1992  European Pat. Off. .

*Primary Examiner*—Ali Neyzari
*Attorney, Agent, or Firm*—Nixon & Vanderhye

[57] ABSTRACT

A data recording and reproducing apparatus uses a rewriteable optical disk with pre-recorded absolute address information, and comprises a data compression circuit for dividing and compressing continuous digital data into compressed plural data blocks, an expansion circuit to restore the compressed data to the original expanded form, and a buffer memory. Data is compressed in discrete data blocks and is recorded sequentially block by block to the optical disk. The compressed data is likewise read block by block from the disk during data reproduction. Using the data expansion circuit to expand the compressed data one block at a time, the data recording and reproducing apparatus can reproduce the original continuous digital data stream. Plural continuous digital data selections can thus be reproduced by alternately fetching data for the plural selections from the disk in compressed data block units and temporarily storing the data to a buffer memory for expansion.

13 Claims, 10 Drawing Sheets

DATA RECORDING/REPRODUCING APPARATUS WITH ALTERNATING ACCESS OF COMPRESSED WORKS

BACKGROUND OF THE INVENTION

1. Field of the Invention

The present invention relates to an optical disk recording and reproducing apparatus using a magneto-optical disk and, more particularly, to a data recording and reproducing apparatus, such as a Compact Disc player.

2. Description of the Prior Art

Figure 9:
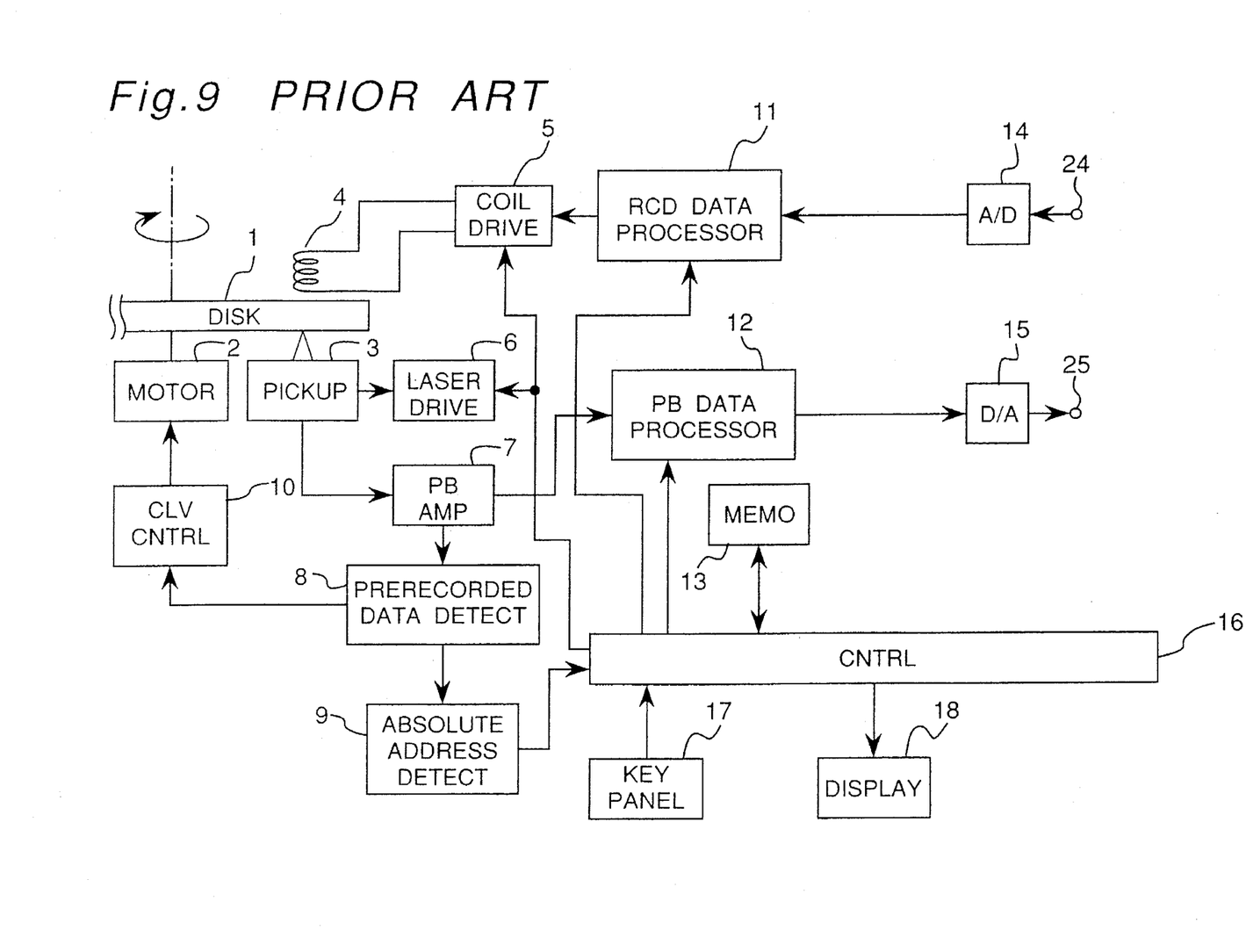
FIG. 9 is a block diagram of a conventional data recording and reproducing apparatus.

FIG. 9 is a block diagram of a conventional apparatus used to record and reproduce continuous digital data, specifically digital audio data.

To make a recording, analog audio data is input from the input terminal 24 and converted to digital audio data by the A/D converter 14. The converted data is then converted by the recording data processing circuit 11 to the data format required for recording, and the processed data is applied to the coil 4 by the coil driver 5. A magnetic field modulated according to the recording data is then applied to the disk 1 by the coil 4.

Based on the commands from the controller 16, the laser driver 6 causes the optical pickup 3 to emit a high output optical beam to the disk 1. This causes a local temperature rise enabling the data to be recorded.

Absolute disk addresses are prerecorded to the disk 1. This address data read from the disk 1 by the optical pickup 3 is input through the playback amplifier 7 to the pre-recorded data detection circuit 8, and a subset of the data is input to the CLV control circuit 10.

The CLV control circuit 10 applies constant linear velocity (CLV) control based on the input data to keep the spindle motor 2 driving at a constant linear velocity. The data from the pre-recorded data detection circuit 8 is also input to the absolute address detection circuit 9, and the location of the optical pickup 3 is input to the controller 16. When data is recorded to the disk 1, the absolute address of the disk area to which data is recorded is registered in and managed by the table of contents (TOC) memory 13.

When data is reproduced, the area to which the data to be reproduced is recorded (i.e., the address) is fetched, and the optical pickup 3 accesses that area. The data recorded to the disk 1 is then read by the optical pickup 3, and input through the playback amplifier 7 to the playback data processing circuit 12.

The playback data processing circuit 12 then converts the input data to digital audio data, and inputs the digital audio data to the D/A converter 15. The D/A converter 15 converts the digital audio data to analog audio data, and outputs the analog audio data from the output terminal 25.

The data record/reproduce commands are input from the operating key panel 17 to the controller 16, which generates the corresponding control signals. The display 18 is controlled by the controller 16 to display the current optical pickup 3 location and the operating status.

With this data recording and reproducing apparatus, however, it is impossible to simultaneously reproduce different, plural selections because reproduction of a recorded selection is executed in real time with reading of the data from the disk by the optical pickup. In addition, when non-consecutive selections at different disk addresses are alternately reproduced, there is a momentary pause in playback due to the seek time of the optical pickup disk access operation, and it is not possible to instantaneously change selections and maintain uninterrupted playback.

SUMMARY OF THE INVENTION

Therefore, an object of the present invention is to provide a data recording and reproducing apparatus or data reproducing apparatus enabling smooth, uninterrupted reproduction of plural data selections.

To achieve this object, a data recording and reproducing apparatus or a data reproducing apparatus for reproducing recorded data from a recording medium to which continuous digital data is divided into plural blocks and compressed for recording according to the invention comprises a buffer memory. This device is characterized by reading non-continuous data in compressed data block units from the recording medium, temporarily storing the data blocks in the buffer memory, and sequentially inputting the data in block units from the buffer memory to the data expansion circuit to reproduce the discrete data blocks as continuous digital data, thus simultaneously reproducing plural data blocks.

When a previously recorded selection is reproduced using the apparatus according to the present invention, the data reading and reproducing operations do not need to be executed in real time, and it is therefore possible to reproduce different selections simultaneously.

For example, let us assume that a 4-second digital audio data block has been compressed and stored to disk as a 1-second data block. It only takes the optical pickup 1 second to read the data from the disk, but the 4-second source signal can be reproduced using the data expansion circuit. This leaves the optical pickup idle for 3 seconds, and this idle time can used by the optical pickup to access, read, and buffer a different selection.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
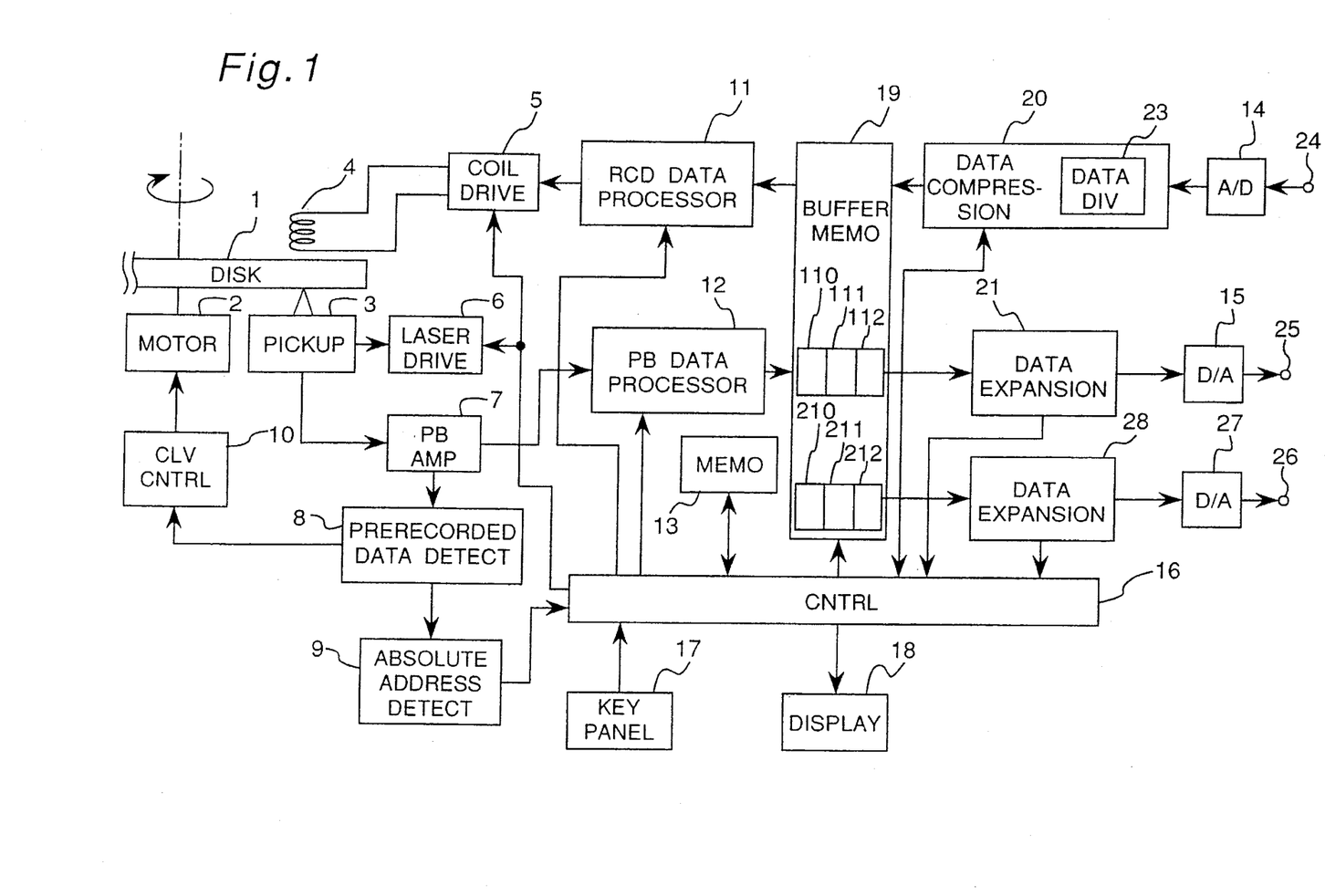
FIG. 1 is a block diagram of a data recording and reproducing apparatus according to the first embodiment of the invention.

The preferred embodiments of the present invention are described hereinbelow with reference to the accompanying figures, of which FIG. 1 is a block diagram of the first embodiment.

The data recording and reproducing apparatus according to the first embodiment has, in addition to the elements provided in the prior art apparatus shown in FIG. 9, buffer memory 19, data compression circuit 20, data divider 23 included in the data compression circuit 20 and two data expansion circuits 21 and 28.

Figure 2:
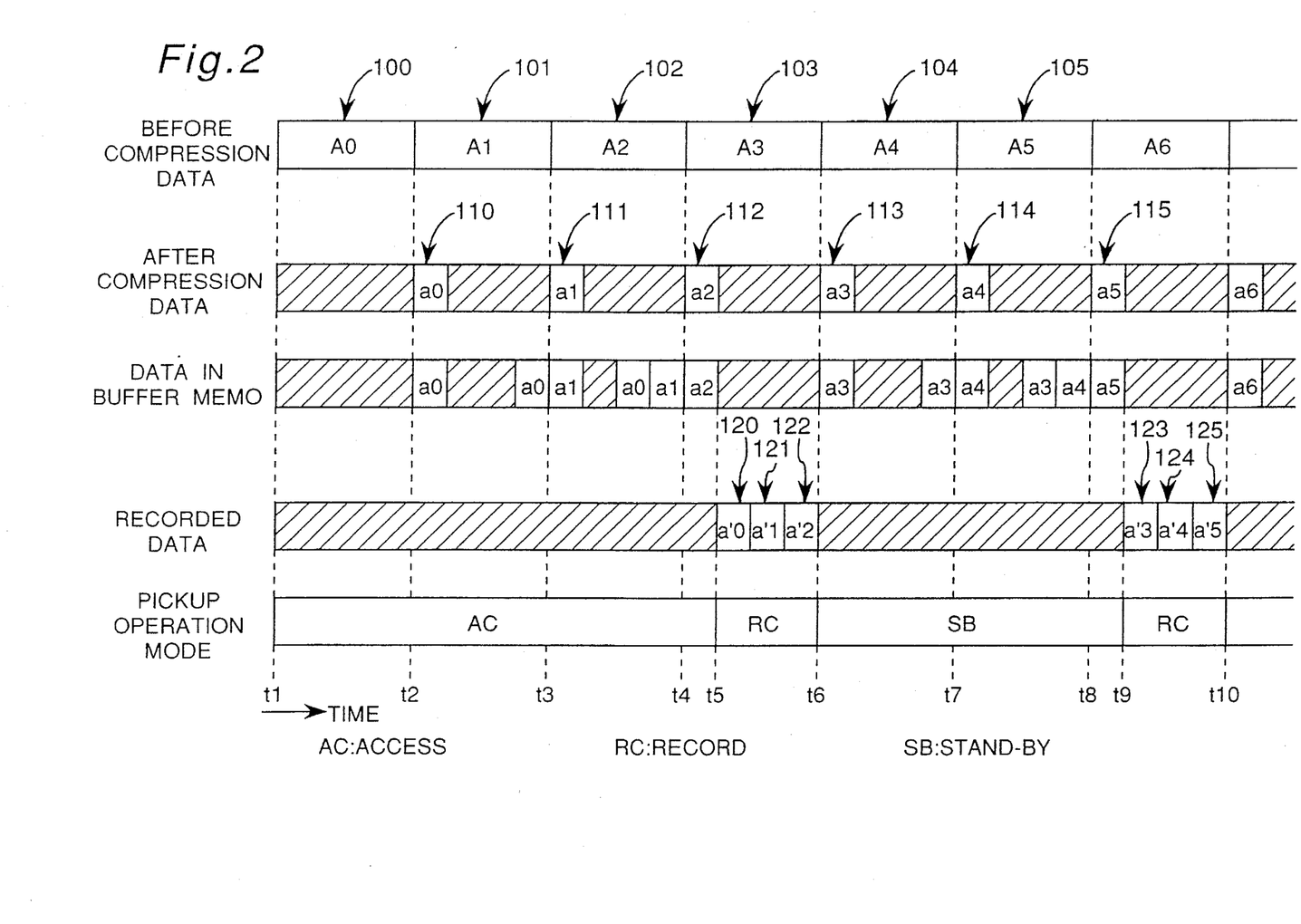
FIG. 2 is a graph of the time-based data flow during the recording process.
Figure 3:
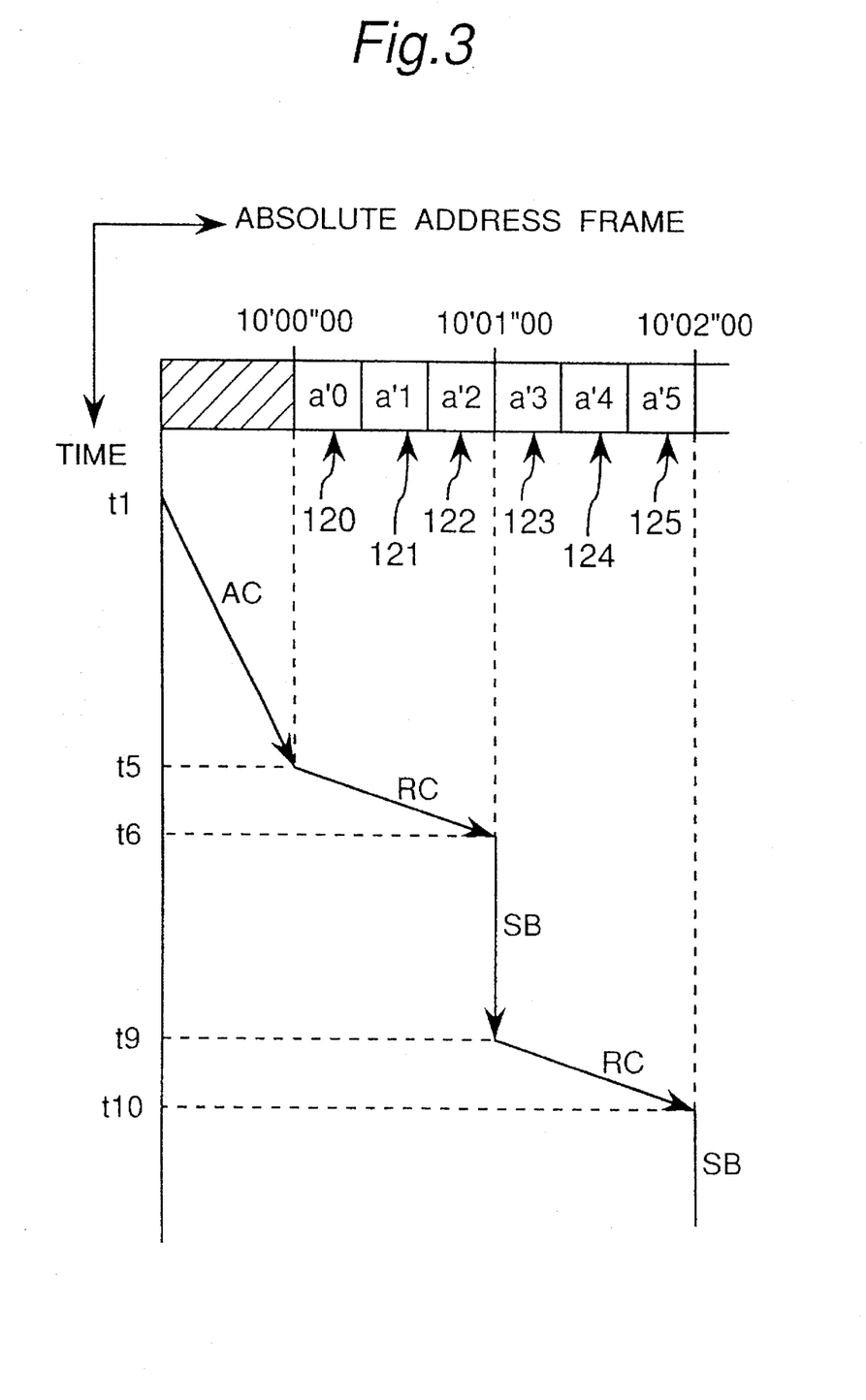
FIG. 3 is a graph of the time-based movement of the optical pickup relative to the absolute disk address during recording.

The steps for recording data of selection A (such as music) in a particular area starting from the absolute address 10'00"00 are first described. The time-based data flow during the recording process is shown in FIG. 2, and the time-based movement of the optical pickup relative to the absolute disk address during recording is shown in FIG. 3.

The recording operation of the first embodiment is described below with reference to FIGS. 1–3.

The analog audio data to be recorded is input from the input terminal 24 and converted to digital audio data by the A/D converter 14. The converted digital audio data is compressed by the data compression circuit 20 and is divided into blocks by data divider 23 after a predetermined length of data is compressed. The compression ratio assumed in FIG. 2 is ¼.

The digital audio data is compressed in predetermined unit amounts A0 100, A1 101, A2 102, A3 103 . . . An, resulting in the corresponding compressed data blocks a0 110, a1 111, a2 112, a3 113 . . . an. The compressed data blocks a0 110, a1 111, a2 112, a3 113 . . . an are temporarily stored to the buffer memory 19, and fetched therefrom for conversion by the recording data processing circuit 11 to the recording data format, resulting in data blocks a'0 120, a'1 121, a'2 122, a'3 123 . . . a'n.

In the example shown in FIGS. 2 and 3 three data blocks are recorded together.

At time t1 the first digital audio data block A0 100 is input to the data compression circuit 20 and compression begins. As shown in FIG. 3, the optical pickup 3 begins to access absolute address 10'00"00, which is the recording start position.

At time t2, while the seek operating continues, input of digital audio data block A0 100 is completed, and compressed data a0 110 is generated and stored to the buffer memory 19. Input of the next digital audio data block A1 101 to the data compression circuit 20 then begins.

At time t3, input of digital audio data block A1 101 is completed, the data is compressed, and the compressed data a1 111 is stored to the buffer memory 19. At this point two compressed data blocks (a0 and a1) are stored in the buffer memory 19.

Input of the next digital audio data block A2 102 to the data compression circuit 20 begins at time t3 and ends at time t4, at which point the compressed data a2 112 is generated and stored in the buffer memory 19. Three compressed data blocks (a0, a1, a2) are thus stored in the buffer memory 19.

These three compressed data blocks (a0, a1, a2) are input to the recording data processing circuit 11, whereby the data is converted to recording data a'0 120, a'1 121, a'2 122 and input to the coil driver 5. Input of the next digital audio data block A3 103 also begins from time t4.

At time t5, the optical pickup 3 completes the seek operation and starts to record the recording data a'0 120, a'1 121, a'2 122.

Recording is completed at time t6, and the optical pickup 3 enters a standby (still) mode until the next recording operation begins at time t9. Input of digital audio data block A3 103 is also completed, and compressed data a3 113 is generated and stored to the buffer memory 19.

This sequence is repeated to compress digital audio data blocks A4 104 and A5 105 to compressed data a4 114 and a5 115, which are stored to the buffer memory 19. At time t9, three compressed data blocks (a3 113, a4 113, a5 115) are stored in the buffer memory 19. The data blocks are therefore input to the recording data processing circuit 11 for conversion to recording data a'3 123, a'4 124, a'5 125, and recorded by the optical pickup 3 as described above to absolute address 10'01"00.

Recording data is thus compressed and recorded simultaneously to the disk 1, and the absolute address of the area to which the selection A was recorded is registered in the TOC memory 13.

Figure 4:
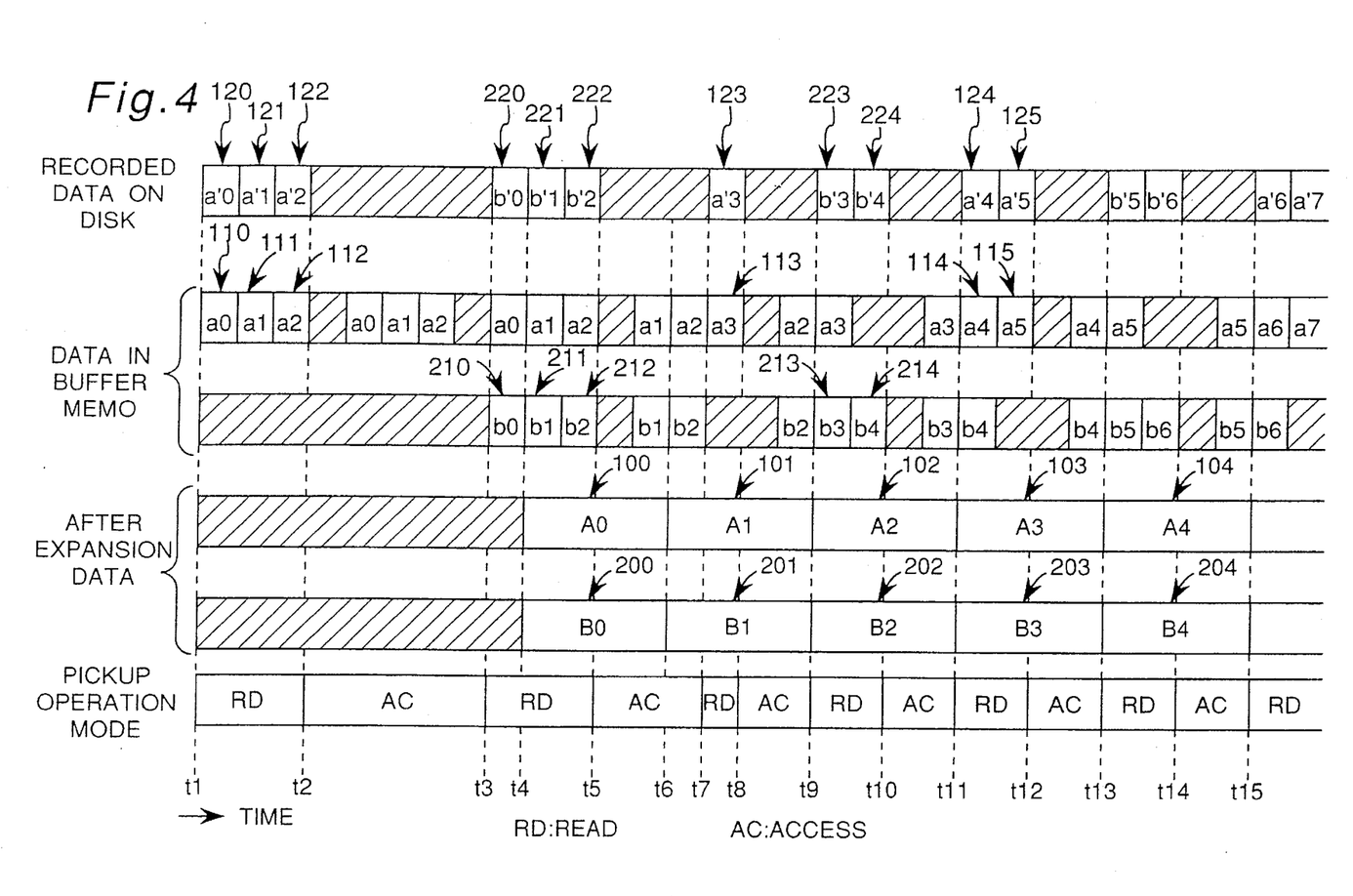
FIG. 4 is a graph of the time-based data flow during the reproducing process.
Figure 5:
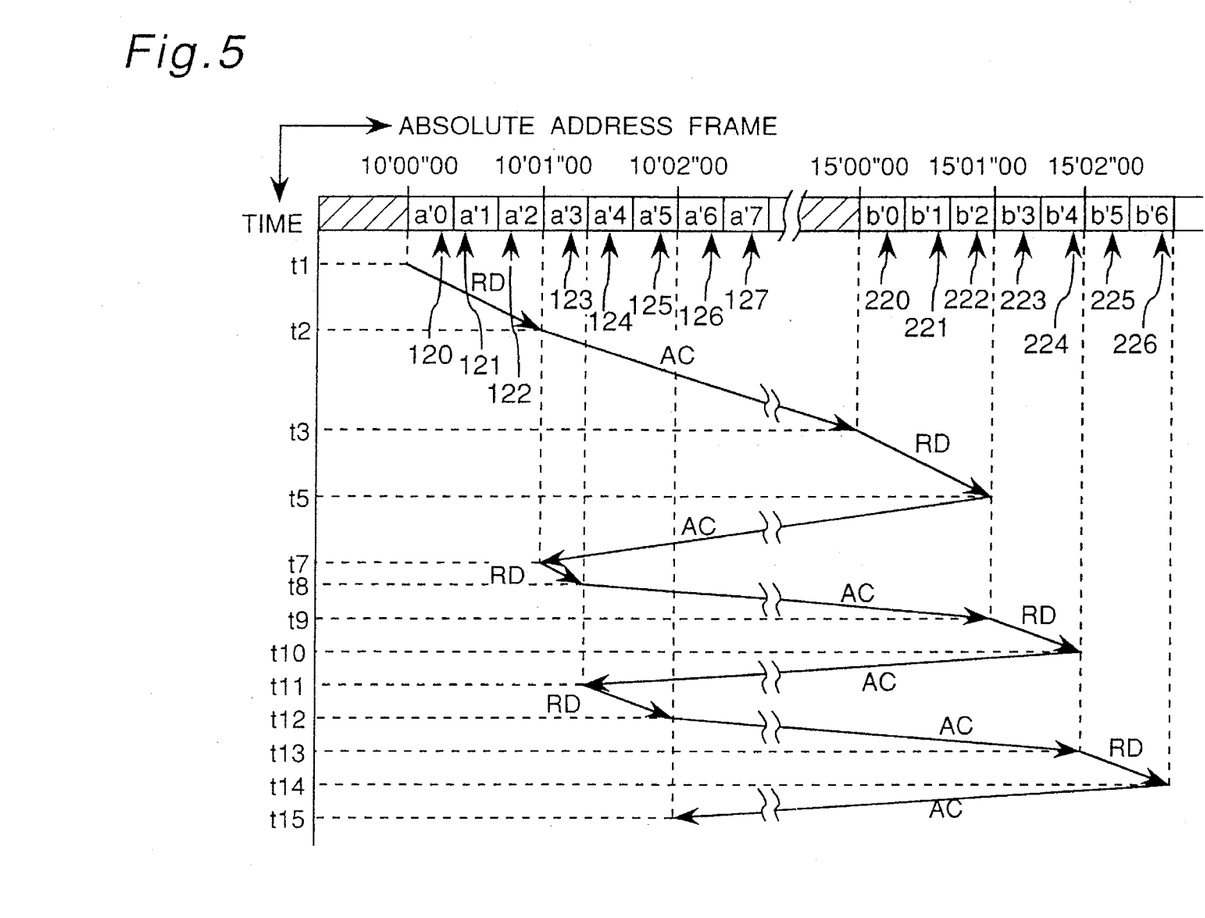
FIG. 5 is a graph of the time-based movement of the optical pickup relative to the absolute disk address during the reproducing process.

Next, the steps for reproducing simultaneously two selections A and B (such as two different music numbers) are described. It is noted that selection A is stored in an area starting from the absolute address of 10'00"00, and selection B is stored in an area starting from the absolute address of 15'00"00 in the disk 1. The time-based data flow during the reproducing process is shown in FIG. 4, and the time-based movement of the optical pickup 3 relative to the absolute disk address during the reproducing process is shown in FIG. 5.

The operation of the first embodiment during reproduction of two selections, A and B, is described below with reference to FIGS. 1, 4, and 5. The two selections (A and B) to be reproduced are selected from the operating key panel 17, which forwards these selections to the controller 16.

The controller 16 first fetches the location (the absolute address) of the recording areas of A and B from the TOC memory 13. The optical pickup 3 then accesses absolute address 10'00"00 as shown in FIG. 5 based on this information, and at time t1 it begins to read the recorded data a'0 120, a'1 121, and a'2 122 for selection A from the disk 1.

The recorded data a'0 120, a'1 121, and a'2 122 is then input through the playback amplifier 7 to the playback data processing circuit 12, and re-converted thereby to compressed data a0 110, a1 111, and a2 112. The compressed data a0 110, a1 111, and a2 112 is then stored in the buffer memory 19.

By time t2 the optical pickup 3 has finished reading the data, and therefore begins to access absolute address 15'00"00 where selection B is recorded.

By time t3 the optical pickup 3 has accessed the address, and therefore begins to read the recorded data b'0 220, b'1 221, and b'2 222 for selection B.

The recorded data b'0 220, b'1 221, and b'2 222 is likewise input through the playback amplifier 7 to the playback data processing circuit 12, and re-converted to compressed data b0 210, b1 211, and b2 212. The compressed data b0 210, b1 211, and b2 212 is then stored in the buffer memory 19.

At time t4 during this playback operation, i.e., when compressed data b0 210 is stored to the buffer memory 19, the compressed data a0 110 and b0 210 in the buffer memory 19 are output to the respective expansion circuits 21 and 28 for expansion to the digital audio data A0 100 and B0 200. The expanded digital audio data blocks A0 100 and B0 200 are then output to the respective D/A converters 15 and 27 for conversion to the analog audio data output from the output terminals 25 and 26.

At time t5 the optical pickup 3 has finished reading the first selection B data (b'0, b'1, b'2), and therefore starts to access the absolute address 10'01"00 of the next data selection A.

At time t6, while the optical pickup 3 is still seeking the address, the next batch of compressed data a1 111 and b1 211 in the buffer memory 19 is output to the respective expansion circuits 21 and 28 for restoration to the digital audio data A1 101 and B1 201. The restored digital audio data A1 101 and B1 201 is then output to the respective D/A converters 15 and 27 for conversion to the analog audio data output simultaneously from the output terminals 25 and 26.

By time t7 the optical pickup 3 has accessed the address, and therefore begins to read the next data block (a'3 123) for selection A. The recorded data a'3 123 is input through the playback amplifier 7 to the playback data processing circuit 22, and re-converted to compressed data a3 113, which is then stored in the buffer memory 19.

By time t8 the optical pickup 3 has finished reading the data, and therefore begins to access absolute address 15'01"00 for the next data selection B.

When access is completed at time t9, the compressed data a2 112 and b2 212 in the buffer memory 19 is output to the respective expansion circuits 21 and 28 for expansion to the digital audio data A2 102 and B2 202. The expanded digital audio data A2 102 and B2 202 is then output to the respective D/A converters 15 and 27 for conversion to the analog audio data output from the output terminals 25 and 26.

During this time, however, the optical pickup 3 reads two blocks of data (b'3 223 and b'4 224) from absolute address 15'01"00 for selection B. These data blocks b'3 223 and b'4 224 are output to the playback data processing circuit 12 through the playback amplifier 7, converted to compressed data b3 213 and b4 214, and then stored to the buffer memory 19.

Reading ends at time t10, and the optical pickup 3 begins seeking the absolute address 10'01"25 of the next selection A data. This procedure is continued to simultaneously play back selections A and B. By thus simultaneously reproducing two different selections by means of a single data recording and reproducing apparatus as shown in FIG. 1, functions that could not be achieved using the prior art become possible.

Figure 6:
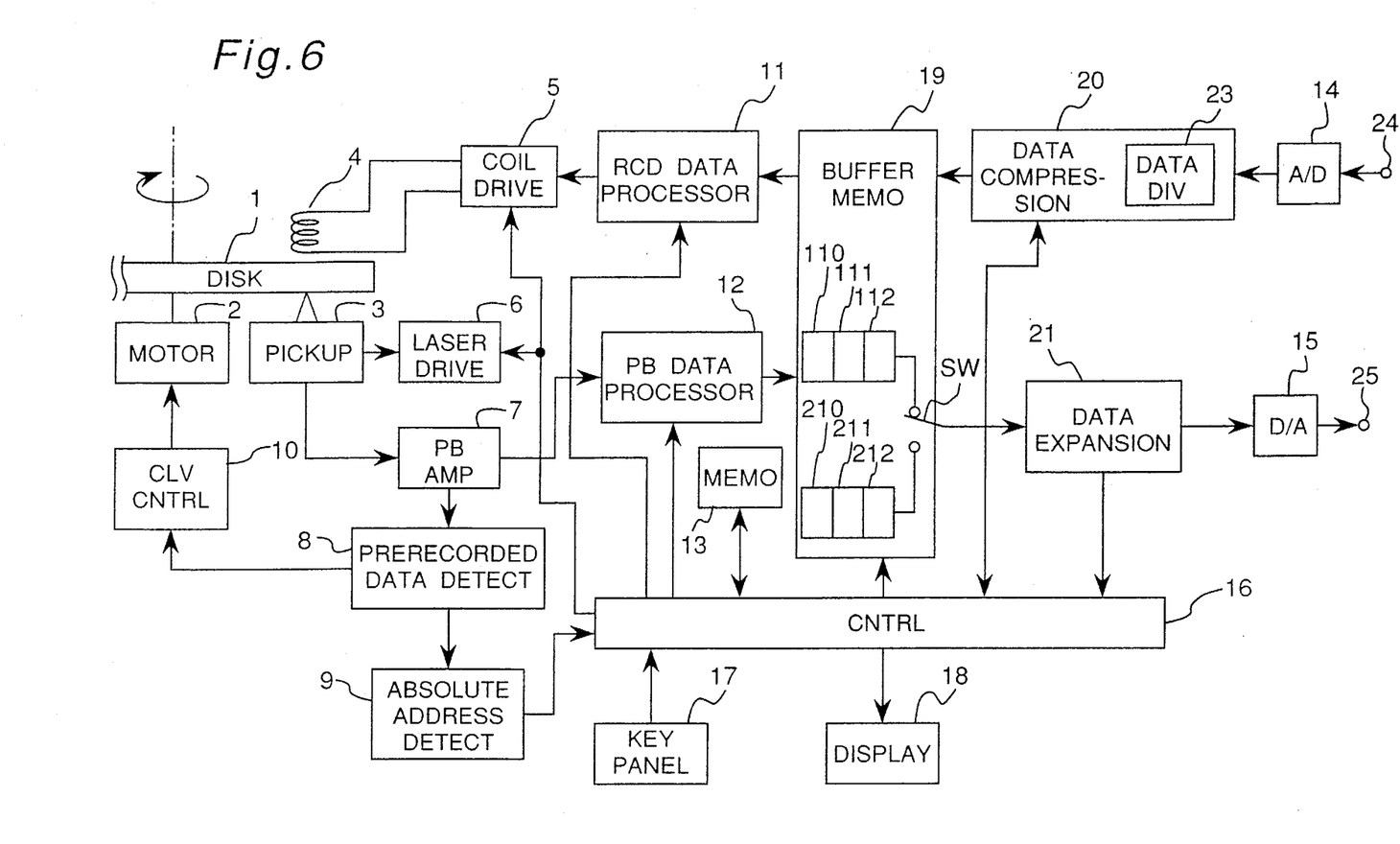
FIG. 6 is a block diagram of a data recording and reproducing apparatus according to the second embodiment of the invention, FIGS. 7a and 7b taken together as shown in FIG. 7 is a graph of the time-based data flow during the data reproducing process.
Figure 7:
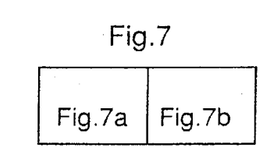
Figure 7A:
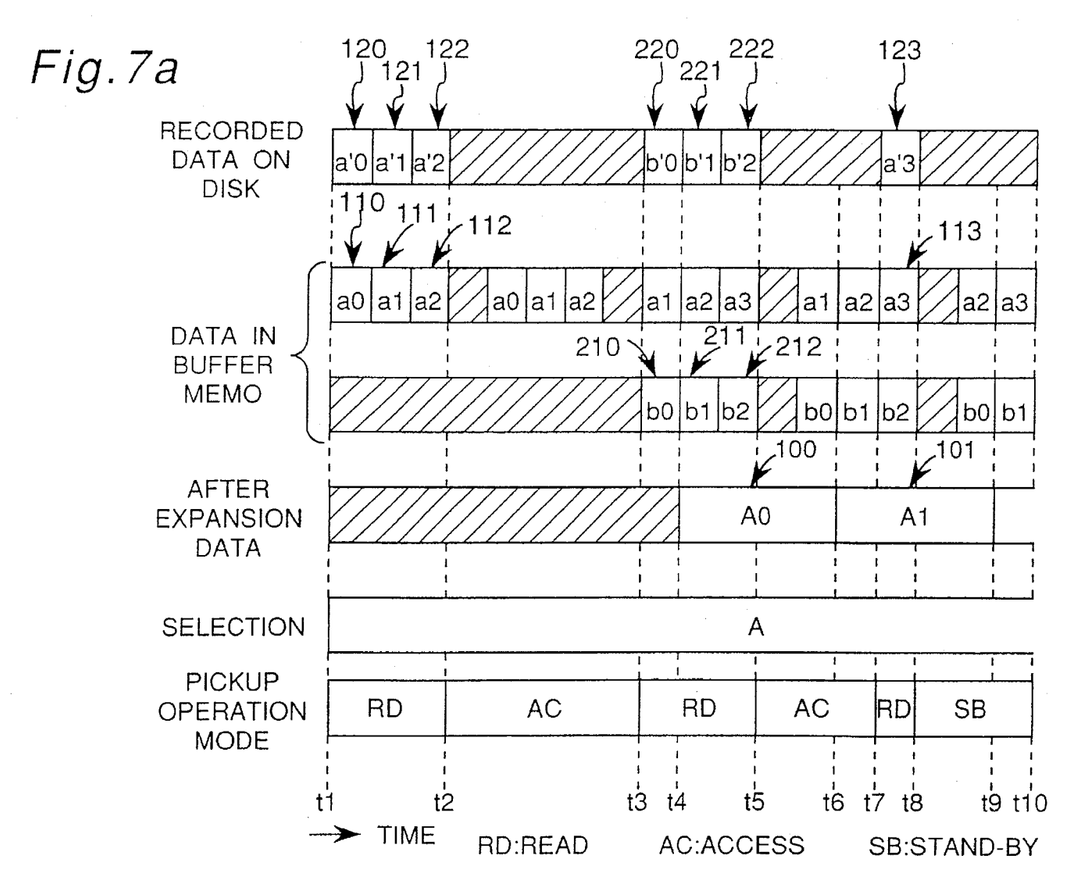
Figure 7B:
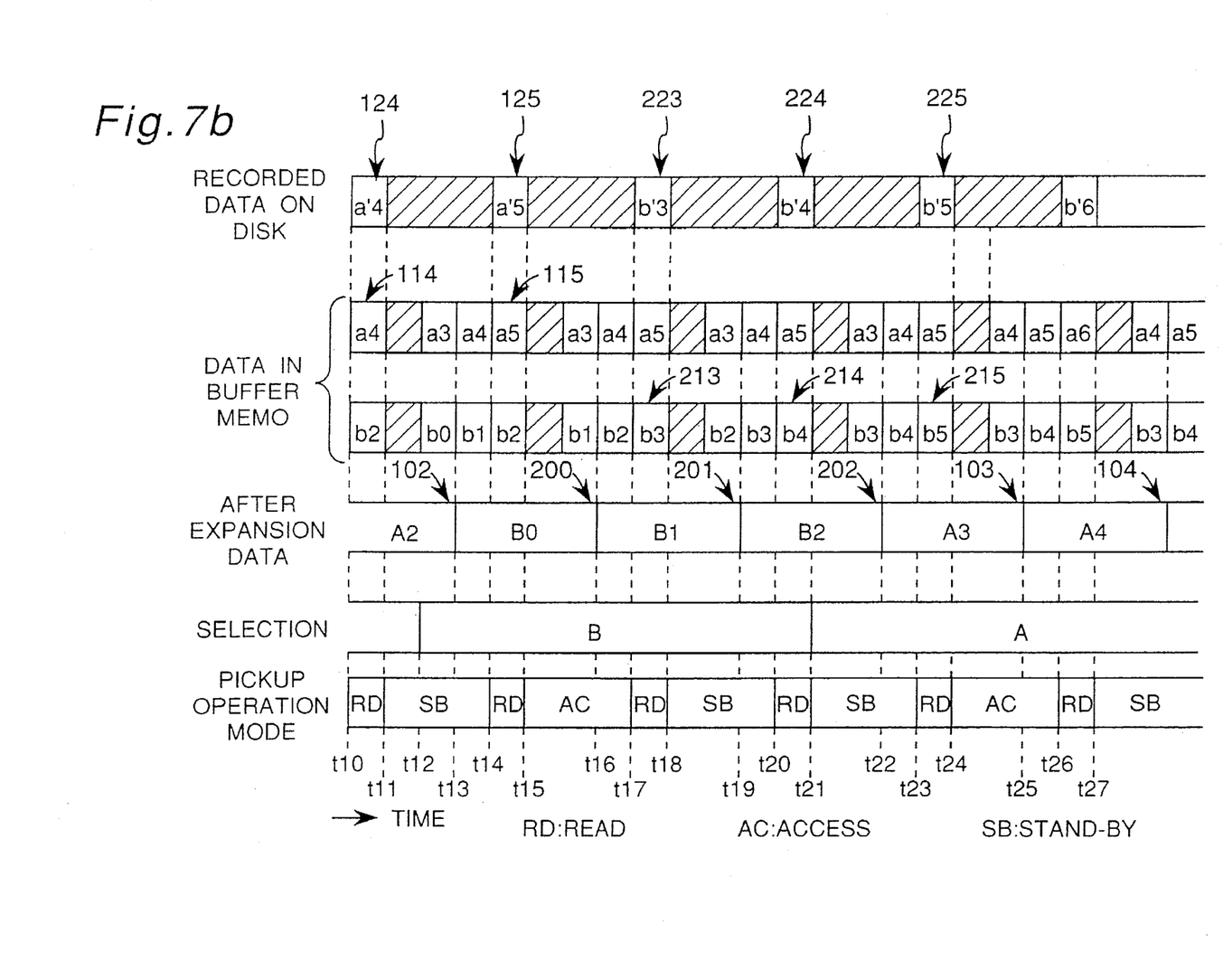
Figure 8:
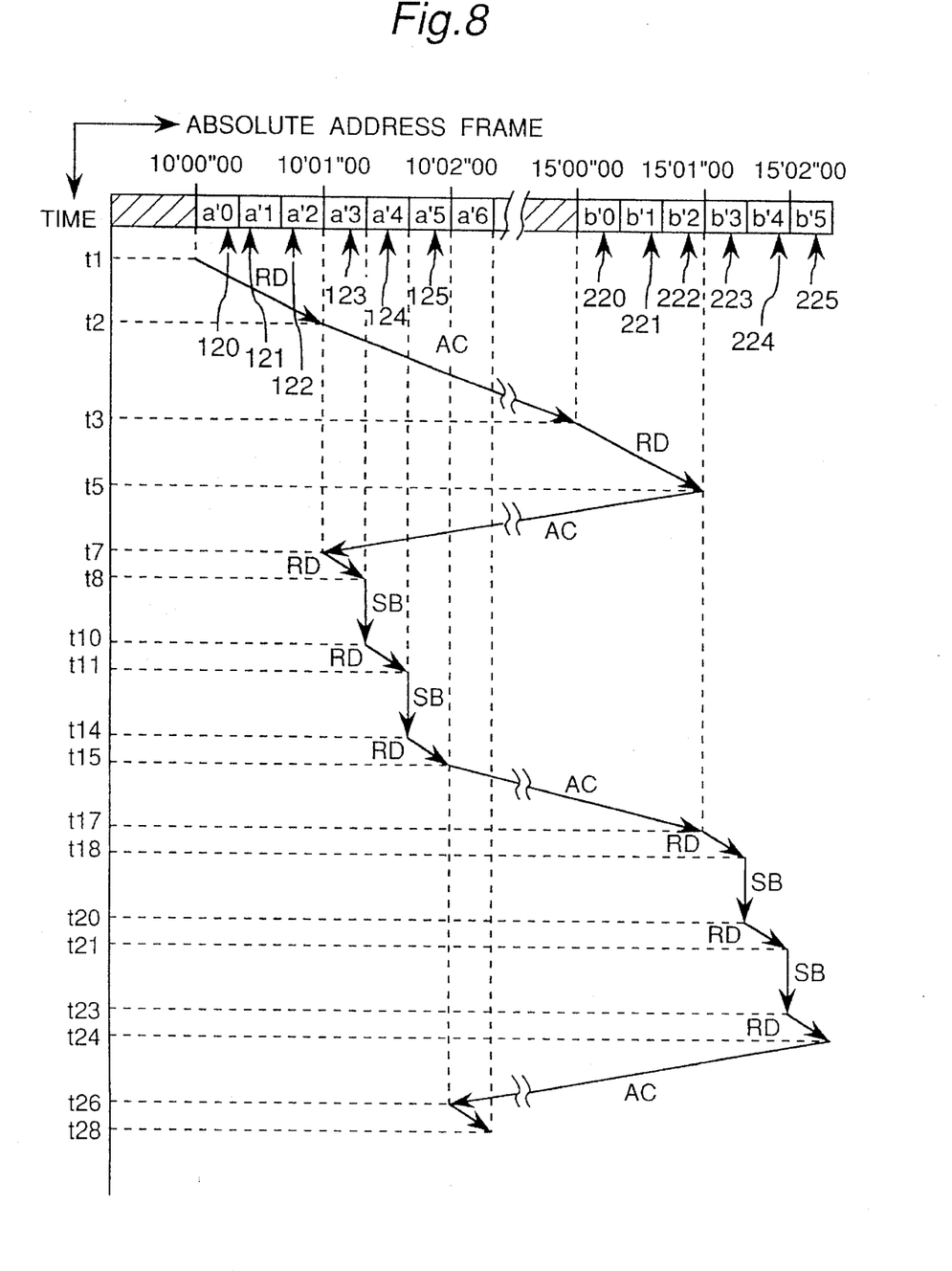
FIG. 8 is a graph of the time-based movement of the optical pickup relative to the absolute disk address during the data reproducing process.

A second embodiment of a data recording and reproducing apparatus according to the present invention is described below with reference to FIGS. 6, 7, and 8. FIG. 6 is a block diagram of the second embodiment, FIGS. 7a and 7b taken together as shown in FIG. 7 is a graph of the time-based data flow during the playback process, and FIG. 8 is a graph of the time-based movement of the optical pickup relative to the absolute disk address during playback.

According to the second embodiment, when compared with the first embodiment of FIG. 1, data expansion circuit 28 and D/A converter 27 are removed. Specifically, the second embodiment comprises only one data expansion circuit 21 and only one D/A converter 15. A switch SW is provided in association with buffer memory 19. The switch SW can be changed in response to the manual key operation effected on the operation key panel 17. Therefore, this embodiment sequentially reproduces plural selections by switching between the selections.

The operation of this embodiment during the recording process is the same as that of the first embodiment described above, and therefore the description thereof is omitted.

The two selections (A and B) to be reproduced are selected from the operating key panel 17, which forwards these selections to the controller 16.

The controller 16 first fetches the position (the absolute address) of the recording areas of A and B from the TOC memory 13. The optical pickup 3 then accesses absolute address 10'00"00 based on this information, and at time t1 begins reading the recorded data a'0 120, a'1 121, and a'2 122 for selection A from the disk 1.

The read recorded data a'0 120, a'1 121, and a'2 122 is input through the playback amplifier 7 to the playback data processing circuit 12, converted thereby to compressed data a0 110, a1 111, and a2 112, and then stored to the buffer memory 19.

By time t2 the optical pickup 3 has finished reading the data, and therefore begins to access absolute address 15'00"00 where selection B is recorded. By time t3 the optical pickup 3 has accessed the address, and therefore begins to read the selection B recorded data b'0 220, b'1 221, and b'2 222.

The read recorded data b'0 220, b'1 221, and b'2 222 is input through the playback amplifier 7 to the playback data processing circuit 12 and converted thereby to the compressed data b0 210, b1 211, and b2 212, which is then stored in the buffer memory 19.

At time t4 when compressed data b0 210 is stored to the buffer memory 19, the controller 16 recognizes a selection A specification from the selection specification data. The controller 16 therefore causes the compressed data a0 110 to be output from the buffer memory 19 to the expansion circuit 21, which expands the compressed data a0 110 to the digital audio data A0 100. The digital audio data A0 100 is then output to the D/A converter 15, converted to analog audio data, and the analog audio data is output from the output terminal 25.

Note that the selection specification data is input from the operating key panel 17.

At time t5 the optical pickup 3 has finished reading and therefore starts to access the absolute address 10'01"00 of the next selection A data a'3 123. At time t6, while the optical pickup 3 is still seeking the address, output of digital audio data A0 100 is completed. The controller 16 therefore scans the selection specification data and recognizes a selection A specification.

The next batch of compressed data a1 111 in the buffer memory 19 is output to the expansion circuits 21 for expansion to the digital audio data A1 101. The expanded digital audio data A1 101 is then converted by the D/A converter 15 to analog audio data, and output from the output terminal 25. Reproduction of selection A thus continues.

By time t7 the optical pickup 3 has accessed the address, and therefore begins to read the next selection A data a'3 123. As described above, the read data a'3 123 is converted and stored in the buffer memory 19.

The optical pickup 3 now enters a standby state until recorded data a'4 124 can be read. At time t9 the controller 16 recognizes the selection A specification from the selection specification data, and reproduces digital audio data A2 102. The read data a'4 124 is also converted and stored in the buffer memory 19.

The optical pickup 3 enters a standby state until recorded data a'5 125 can be read. When output of digital audio data A2 102 ends at time t13, the controller 16 recognizes a change to a selection B specification from the selection specification data. It therefore outputs the compressed data b0 210 from the buffer memory 19 to the expansion circuit 21. The compressed data b0 210 is similarly expanded to digital audio data B0 200, which is converted to analog audio data by the D/A converter 15 and output from the output terminal 25.

The selection being reproduced is thus changed from selection A to selection B.

The selection A data a'5 125 is nevertheless read at time t14 after the selection is changed. This results in compressed data a3 113, a4 114, and a5 115 being stored in the buffer memory 19.

At time t15 reading is completed and the optical pickup 3 begins to seek absolute address 15'01"00 to read the next block of data b'3 223 for selection B. Reproduction of selection B is thus sustained for a period.

When output of digital audio data B2 202 ends at time t22, the controller 16 again recognizes a change in the selection to selection A from the selection specification data.

As a result, compressed data a3 113 is read from the buffer memory 19, expanded to the digital audio data A3 103, converted to analog audio data by the D/A converter 15, and output from the output terminal 25. Playback is therefore switched back to selection A. In addition, playback of selection A continues from the point at which selection A stopped when playback was previously changed to selection B. There is also no interruption of the playback sound when the selection is changed, and playback continues smoothly.

It is to be noted that the first and second embodiments of the invention were described above with respect to the reproduction of two different selections, but the invention shall not be so limited. In addition, rotation and access of the disk 1 is achieved as described below in both of the above embodiments.

The absolute addresses of the disk 1 are pre-recorded to the disk 1. The data obtained by the optical pickup 3 is input to the pre-recorded data detection circuit 8 through the playback amplifier 7, and a subset of this data is input to the CLV control circuit 10.

The CLV control circuit 10 applies constant linear velocity (CLV) control based on the input data to keep the spindle motor 2 driving at a constant linear velocity. The data from the pre-recorded data detection circuit 8 is also input to the absolute address detection circuit 9, and the location of the optical pickup 3 is input to the controller 16. The controller 16 controls disk access based on this optical pickup 3 location information.

The method used for digital audio data compression and expansion is preferably the method described in "Standardization trends and algorithms for sound encoding" (Technical report IT89-79, Assoc. of Electronic Information Communications of Japan), but other methods may also be used.

As described hereinabove, a data recording and reproducing apparatus according to the present invention can simultaneously reproduce plural different selections recorded to a single optical disk. In addition, the invention can also switch without interruption between reproduction of plural different selections recorded on a single optical disk.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data reproducing apparatus for reproducing compressed data blocks stored in a recording medium comprising:

a pickup for reading compressed data blocks in alternating fashion from differently addressable first and second areas on said recording medium;

a buffer memory connected to the pickup for temporarily storing the read compressed data blocks from the first area to define a first train of compressed data blocks and for temporarily storing the read compressed data blocks from the second area to define a second train of compressed data blocks; and data expansion means for expanding at least one of said first and second trains of compressed data blocks, said data expansion means comprising first and second data expansion circuits for simultaneously expanding said first and second trains of compressed data blocks, and wherein said data expansion means comprises selection switch means for selecting one of said first and second trains of compressed data blocks and one data expansion circuit for expanding the selected train of compressed data blocks.

2. A data recording/reproducing apparatus for recording input data on a recording medium in compressed data blocks and for reproducing compressed data blocks from the recording medium comprising:

data dividing means for dividing input data into a plurality of blocks;

data compression means for compressing input data in each block to produce a compressed data block;

buffer memory means for temporarily storing a predetermined number of compressed data blocks;

recording control means for recording compressed data blocks on said recording medium;

reading means for reading compressed data blocks from at least first and second areas on said recording medium, alternatively;

said buffer memory means for temporarily storing the read compressed data blocks to define a first train of compressed data blocks and a second train of compressed data blocks; and data expansion means for expanding at least one of said first and second trains of compressed data blocks.

3. A data reproducing apparatus as claimed in claim 2, wherein said data expansion means comprises first and second data expansion circuits for simultaneously expanding said first and second trains of compressed data blocks.

4. A data reproducing apparatus as claimed in claim 2, wherein said data expansion means comprises selection switch means for selecting one of said first and second trains of compressed data blocks and one data expansion circuit for expanding the selected train of compressed data blocks.

5. A data reproducing apparatus for reproducing compressed data blocks stored in a recording medium, the apparatus comprising:

a pickup for reading compressed data blocks in alternating fashion from differently addressable first and second areas on said recording medium;

a buffer memory for at least temporarily storing sets of read compressed data blocks;

a first data expansion unit connected to the buffer memory for expanding read compressed data blocks obtained from the first area;

a second data expansion unit connected to the buffer memory for expanding read compressed data blocks obtained from the second area;

a controller which coordinates operation of the pickup and storage of read compressed data in the buffer memory with operation of the first and second data expansion units, whereby by a time that a first set of read compressed blocks from the first area is expanded by the first data expansion unit and a first set of read compressed blocks from the second area is expanded by the second data expansion unit, a second set of read compressed blocks is read from the first area and stored in the buffer memory and a second set of read compressed blocks is read from the second area and stored in the buffer memory.

6. A data reproducing apparatus as claimed in claim 5, whereby by a time that the second set of read compressed blocks from the first area is expanded by the first data expansion unit and the second set of read compressed blocks from the second area is expanded by the second data expansion unit, a third set of read compressed blocks is read from the first area and stored in the buffer memory and a third set of read compressed blocks is read from the second area and stored in the buffer memory.

7. A data reproducing apparatus as claimed in claim 5, wherein the pickup is an optical pickup.

8. A data reproducing apparatus as claimed in claim 5, wherein the data reproducing apparatus is a compact disk player, and wherein the first train of compressed data blocks is a first musical tune and the second train of compressed data blocks is a second musical tune.

9. A data reproducing apparatus as claimed in claim 5, wherein the first set of read compressed blocks from the first area is expanded by the first data expansion unit at the same time that the first set of read compressed blocks from the second area is expanded by the second data expansion unit.

10. A data reproducing apparatus as claimed in claim 5, wherein the first set of read compressed blocks from the first area and the second area consist of three data blocks.

11. A method for reproducing data stored in compressed data blocks stored on a recording medium, the method comprising:

(1) reading a first set of data blocks from a first addressable area on the recording medium and then reading a first set of data blocks from a second addressable area on the recording medium;

(2) temporarily storing the first set of data blocks from the first addressable area and the first set of data blocks from the second addressable area in a buffer memory;

(3) simultaneously expanding the first set of read compressed data blocks obtained from the first area and expanding the first set of read compressed data blocks obtained from second area; and (4) prior to completion of the simultaneous expansion of step (3), reading into the buffer memory a second set of data blocks from the first addressable area on the recording medium and then reading into the buffer memory a second set of data blocks from the second addressable area on the recording medium.

12. The method of claim 11, wherein the simultaneous expansion involves usage of two data expansion units operating in parallel.

13. A method for reproducing data stored in compressed data blocks stored on a recording medium, the method comprising:

(1) reading a first set of data blocks from a first addressable area on the recording medium and then reading a first set of data blocks from a second addressable area on the recording medium;

(2) temporarily storing the first set of data blocks from the first addressable area and the first set of data blocks from the second addressable area in a buffer memory;

(3) simultaneously expanding the first set of read compressed data blocks obtained from the first area and expanding the first set of read compressed data blocks obtained from second area; and (4) prior to completion of the simultaneous expansion of step (3), reading into the buffer memory a second set of data blocks from the first addressable area on the recording medium and then reading into the buffer memory a second set of data blocks from the second addressable area on the recording medium.

* * * * *